(12) United States Patent
Kidakarn

(10) Patent No.: US 7,837,559 B2
(45) Date of Patent: Nov. 23, 2010

(54) GAME CONTROLLER WITH INTERNAL ENCLOSURE

(76) Inventor: Michael Kidakarn, 108 N. Ynez Ave., Suite 208, Monterey Park, CA (US) 91754

( * ) Notice: Subject to any disclaimer, the term of this patent is extended or adjusted under 35 U.S.C. 154(b) by 798 days.

(21) Appl. No.: 11/801,828

(22) Filed: May 10, 2007

(65) Prior Publication Data

US 2008/0280681 A1  Nov. 13, 2008

(51) Int. Cl.
*G06F 17/00* (2006.01)
(52) U.S. Cl. ........................................................ 463/37
(58) Field of Classification Search ............. 463/36–38; 345/156; 273/148 B
See application file for complete search history.

(56) References Cited

U.S. PATENT DOCUMENTS 6,001,014 A * 12/1999 Ogata et al. .................... 463/37
6,241,247 B1 * 6/2001 Sternberg et al. ........ 273/148 B
6,710,766 B1 * 3/2004 Ogata .......................... 345/156
7,582,017 B2 * 9/2009 Sternberg et al. ............. 463/36
2005/0075172 A1 * 4/2005 Coleman ...................... 463/47

* cited by examiner

*Primary Examiner*—Ronald Laneau
(74) *Attorney, Agent, or Firm*—Raymond Y. Chan; David and Raymond Patent Firm

(57) ABSTRACT

A game controller includes a control unit and a control housing. The control unit includes a circuit board and a plurality of functional controls, wherein each of the functional controls has a movable control end and a signal end operatively coupling with the circuit board. The control housing includes an outer casing having a receiving cavity receiving the circuit board therein and a plurality of control holes for the control ends of the functional controls extending out of the receiving cavity, and an internal enclosure, which is received in the receiving cavity of the outer casing, having a sealing cavity for the circuit board supporting therein to form a double-wall structure to protect the circuit board and a plurality of guiding slots aligned with the control holes of the outer casing respectively to guide the functional controls extending to the control holes through the guiding slots respectively.

17 Claims, 6 Drawing Sheets

GAME CONTROLLER WITH INTERNAL ENCLOSURE

BACKGROUND OF THE PRESENT INVENTION

1. Field of Invention

The present invention relates to a game input device, and more particularly to a game controller with an internal enclosure, which is adapted not only to protect the circuit board within the internal enclosure but also to allow the outer casing to be interchangeable so as to enhance the overall aesthetic appearance of the game controller.

2. Description of Related Arts

Video or computer games become more and more popular nowadays, for example, "X-box" and "PlayStation" are sold extremely well all over the world. Game developers have developed games which promote health and provide information from kids to adults. Such games have the ability to capture and keep the players attention and allow them to interact with the information in a meaningful way. Game developers are now also creating games for entertainment and education. In addition, multiplayer games, which take advantage of the fact that computer games can be played through the Internet, provide players with the opportunity to compete with other players all over the world.

Video game input device is one of the best tools to play video games and becomes a necessary component of the video or computer games. Accordingly, the player is able to input the command signal to the video console through wire or wireless Generally speaking, a conventional game input device comprises an outer casing, a circuit board received in the outer casing, a plurality of functional controls which are electrically coupled with the circuit board and are protruded from the outer casing for the player to input the commands. However, the conventional game input device has several drawbacks.

Accordingly, the video game input devices are different in shape, size, design, button configuration, and game identification. The manufacturers must manufacture different video game input devices with respect to the game consoles. In other words, the outer casing is specially designed to form a plurality of holes for the control buttons alignedly passing therethrough. Therefore, the manufacturing cost of the video game input device is relatively high. Furthermore, a plurality of guiding marks are printed on the outer casing to indicate the function of the control buttons respectively. However, the guiding marks are faded after a period of continuous use in which the player is unable to repair or re-print the guiding mark on the outer casing. Thus, the outer casing should be made of light weight material such as plastic for being easily handled. However, the outer casing is extremely fragile that when the outer casing is cracked, the circuit board within the outer casing will not be well-protected. In fact, the circuit board can be easily damaged by applying an impact force at the outer casing. Accordingly, once the outer casing is broken, dust or liquid will enter into the outer casing through the crack. Moreover, the design of the outer casing is universal such that the video game input device lacks of identification and personalization.

SUMMARY OF THE PRESENT INVENTION

A main object of the present invention is to provide a game controller with an internal enclosure, which is adapted not only to protect the circuit board within the internal enclosure but also to allow the outer casing to be interchangeable so as to enhance the overall aesthetic appearance of the game controller.

Another object of the present invention is to provide a game controller with an internal enclosure, wherein the circuit board is sealed within the internal enclosure such that the circuit board is double-protection by the internal enclosure and the outer casing so as to minimize the external impact force the circuit board directly applying to the circuit board.

Another object of the present invention is to provide a game controller with an internal enclosure, wherein the player is able to interchange the outer casing to enhance the identification and personalization of the game controller. In other words, different sizes of the outer casings are designed to fit for the internal enclosure such that the player is able to select different sizes, designs, or shapes of the outer casing to personalize the game controller to operatively connect to the same game console.

Another object of the present invention is to provide a game controller with an internal enclosure, which does not require to alter the original structural design of the game controller, so as to minimize the manufacturing cost of the game controller incorporating with the internal enclosure.

Another object of the present invention is to provide a game controller with an internal enclosure, wherein no expensive or complicated structure is required to employ in the present invention in order to achieve the above mentioned objects. Therefore, the present invention successfully provides an economic and efficient solution for not only providing a shielding configuration for the circuit board but also enhancing the aesthetic appearance of the game controller.

Accordingly, in order to accomplish the above objects, the present invention provides a game controller, comprising:

a control unit which comprises a circuit board and a plurality of functional controls, wherein each of the functional controls has a movable control end and a signal end operatively coupling with the circuit board; and a control housing, comprising:

an outer casing having a receiving cavity receiving the circuit board therein and a plurality of control holes for the control ends of the functional controls extending out of the receiving cavity; and an internal enclosure, which is received in the receiving cavity of the outer casing, having a sealing cavity for the circuit board supporting therein to form a double-wall structure to protect the circuit board and a plurality of guiding slots aligned with the control holes of the outer casing respectively to guide the functional controls extending to the control holes through the guiding slots respectively.

These and other objectives, features, and advantages of the present invention will become apparent from the following detailed description, the accompanying drawings, and the appended claims.

DETAILED DESCRIPTION OF THE PREFERRED EMBODIMENT

Figure 1:
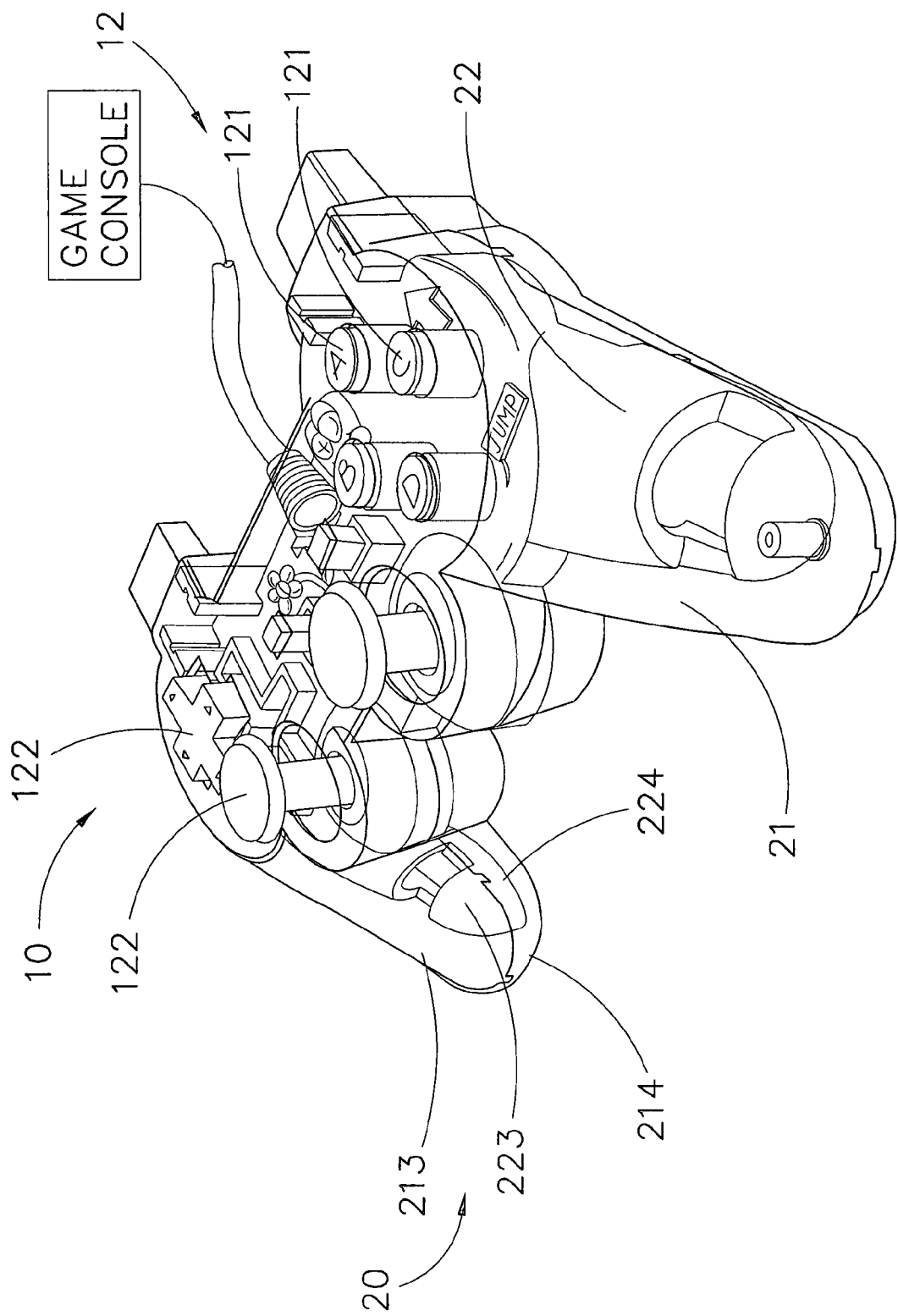
FIG. 1 is a perspective view of a game controller with an internal enclosure according to a preferred embodiment of the present invention.
Figure 2:
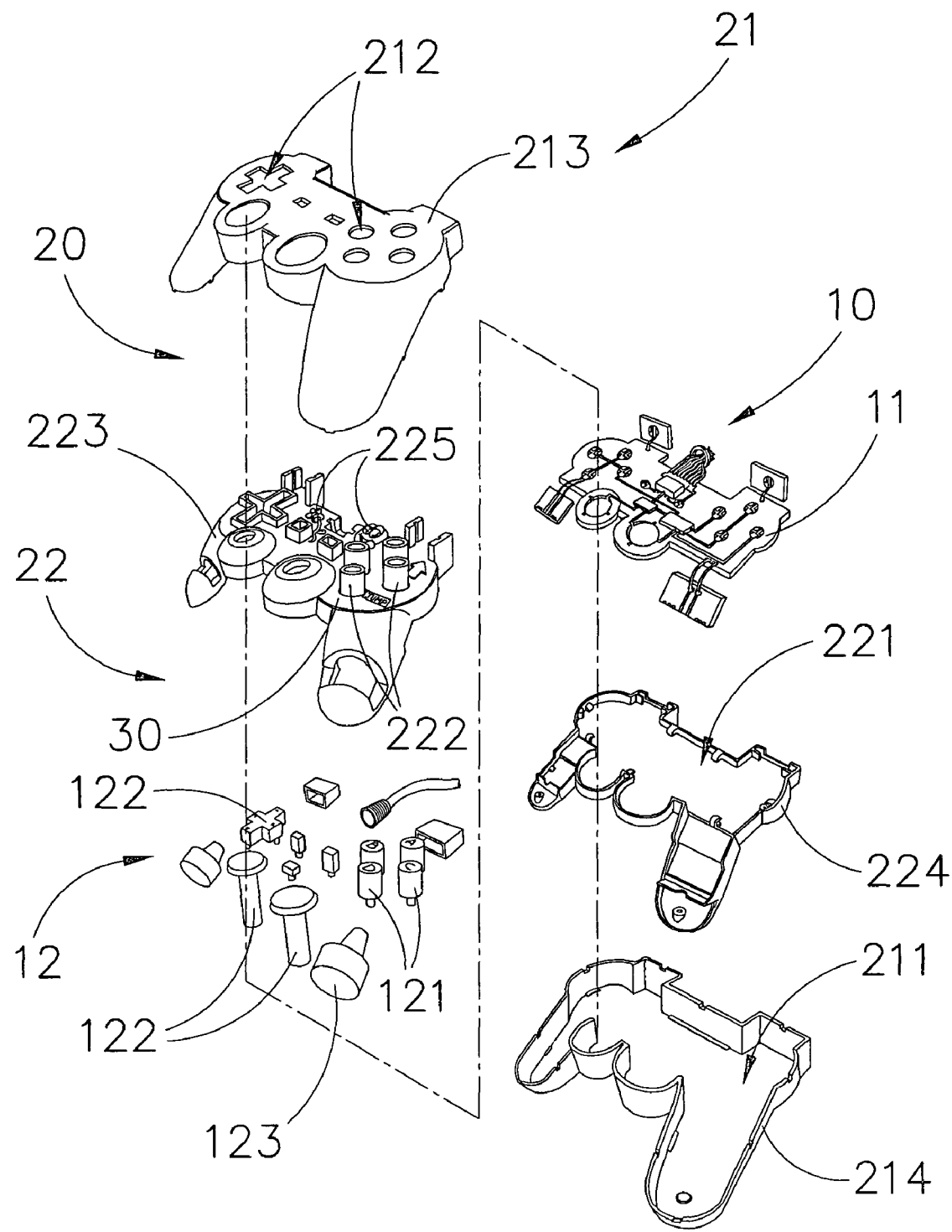
FIG. 2 is an exploded perspective view of a game controller with an internal enclosure according to the above preferred embodiment of the present invention.
Figure 3:
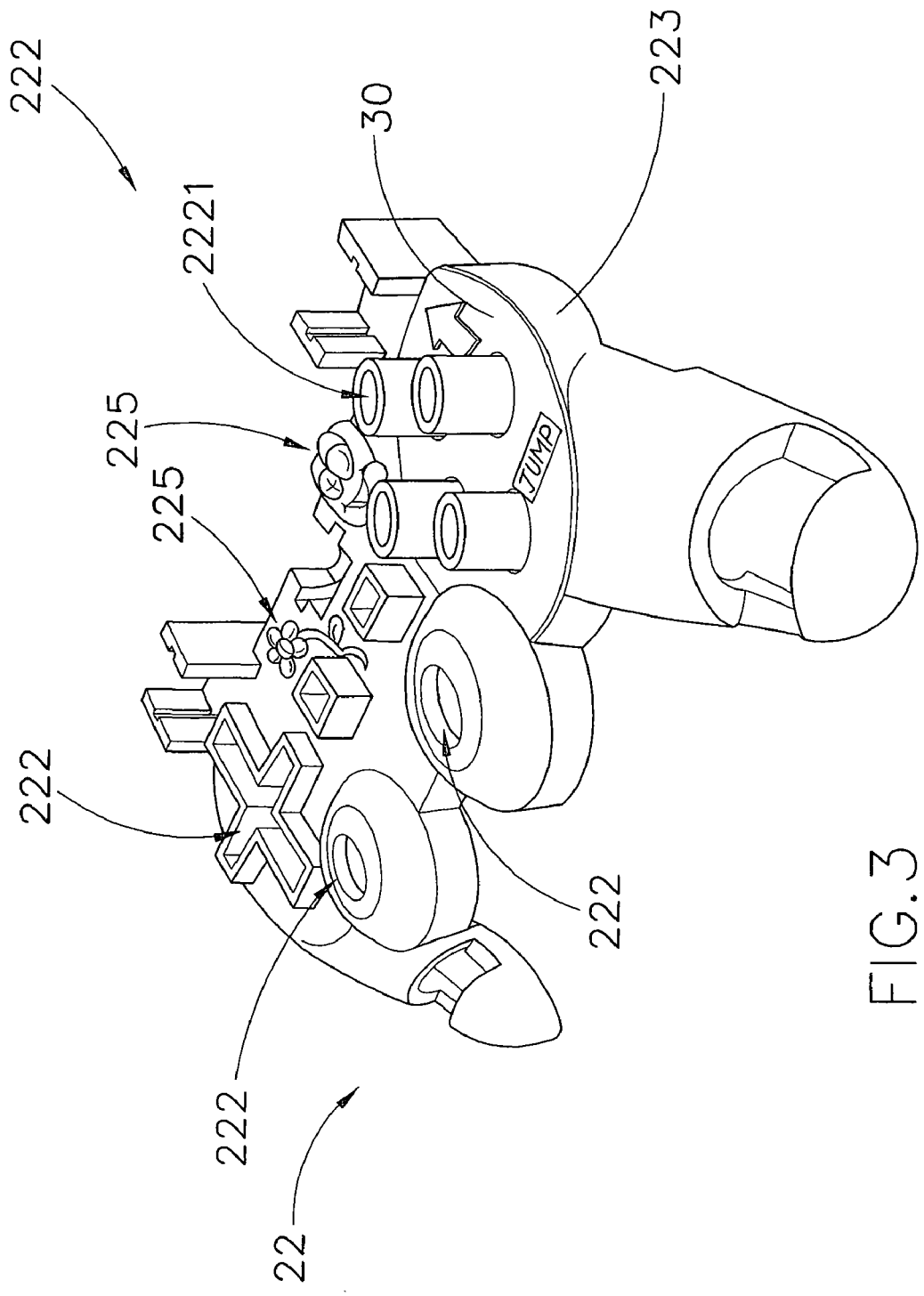
FIG. 3 is a perspective view of the upper bracket of the internal enclosure of the game controller according to the above preferred embodiment of the present invention.

Referring to FIGS. 1 to 3 of the drawings, a game controller according to a preferred embodiment of the present invention is illustrated, wherein the game controller is adapted to operatively connect to a game console through wire or wireless connection. Accordingly, the game controller comprises a control unit 10 and a control housing 20.

The control unit 10 comprises a circuit board 11 and a plurality of functional controls 12, wherein each of the functional controls 12 has a movable control end and a signal end operatively coupling with the circuit board 11. According to the preferred embodiment, each of the functional controls 12 can be a control button 121 depressably mounted on the circuit board 11, a joystick 122 pivotally mounted on the circuit board 11, and/or a trigger lever 123 movably mounted on the circuit board 11.

The control housing 20 comprises an outer casing 21 and an internal enclosure 22 received in the outer casing 21. The outer casing 21 has a receiving cavity 211 receiving the circuit board 11 therein and a plurality of control holes 212 for the control ends of the functional controls 12 extending out of the receiving cavity 211. The internal enclosure, which is received in the receiving cavity 211 of the outer casing 21, has a sealing cavity 221 for the circuit board 11 supporting therein to form a double-wall structure to protect the circuit board 11 and a plurality of guiding slots 222 aligned with the control holes 212 of the outer casing 21 respectively to guide the functional controls 12 extending to the control holes 212 through the guiding slots 222 respectively.

As shown in FIG. 2, the outer casing 21 comprises an upper casing body 213 and a lower casing body 214 detachably coupling with the upper casing body 213 edge-to-edge to define the receiving cavity 211 between the upper and lower casing bodies 213, 214 for enclosing the internal enclosure 22. Accordingly, the shape, size, and sculpture of the outer casing 21 can be different from the shape, size, and sculpture of the internal enclosure 22 such that the game controller of the present invention can be manufactured in any design or style different from the conventional universal input device.

In particularly, the upper casing body 213 is snap fitted to the lower casing body 214 in a tool-less manner. Accordingly, a plurality of snap hooks are spacedly extended from the edge of the upper casing body 213 and a plurality of snap recesses are spacedly provided at the edge of the lower casing body 214 such that when the snap hooks are detachably engaged with the snap recesses respectively, the upper casing body 213 is detachably coupled with the lower casing body 214 to form the outer casing 21. In other words, the player is able to interchange from one of the outer casings 21 with another outer casing 21 via the snap fit in a tool-less manner. It is worth to mention that the player is able to change the outer casing 21 with a size corresponding to the hand size of the player such that the player having a bigger hand size is able to use the larger outer casing 21 for better control. For example, the player is able to change an oversized outer casing 21 instead of using the conventional input device having a standard size.

Furthermore, the outer casing 21 is made of see-through material, which can be transparent material or translucent material such as ABS plastic, to house the internal enclosure 22 such that when the internal enclosure 22 is enclosed within the outer casing 21, the internal enclosure is adapted to be seen through the outer casing 21 to enhance the an aesthetic appearance of the control housing 20.

According to the preferred embodiment, the internal enclosure 22, which is preferably made of PVC plastic, comprises an upper internal bracket 223 and a lower internal bracket 224 sealing and affixing to the upper internal bracket 223 to define the sealing cavity 221 between the upper and lower internal brackets 223, 224 for sealing the circuit board 11. As shown in FIG. 2, the upper internal bracket 223 is affixed to the lower internal bracket 224 edge-to-edge to seal the sealing cavity 221 so as to protect the circuit board 11 therein. In other words, when the internal enclosure 22 is enclosed within the outer casing 21, the internal enclosure 22 will not be physically interfaced by human contact. Thus, the outer casing 21 can protect the internal enclosure 22 and the circuit board 11 to prevent dust or liquid entering into the internal enclosure 22.

As shown in FIG. 3, the internal enclosure 22 further contains a plurality of sculptural characters 225 integrally protruded from the internal enclosure 22 towards the outer casing 21 such that the sculptural characters 225 are adapted to be seen through when the outer casing 21 is made of see-through material, so as to further enhance the aesthetic appearance of the control housing 20. Accordingly, the sculptural characters 225 can be configured as the game character to enhance the personalization of the game controller of the present invention. Preferably, the sculptural characters 225 are outwardly protruded from the upper internal bracket 223 to provide a visual impression of the game controller.

Each of the guiding slots 222 contains a guiding channel 2221 extended from the internal enclosure 22 towards the outer casing 21 to communicate the sealing cavity 221 with the respective control hole 212 such that each of the functional controls 12 is secured and guided to extend through the respective guiding channel 2221 to the outer casing 21. Accordingly, each of the functional controls 12 has a neck portion defining between the control end and the signal end wherein the neck portion of each of the functional controls 12 is guided along the respective guiding channel 2221.

Each of the guiding channel 2221 has a predetermine configuration corresponding to a movement of the respective functional control 12 so as to guide the movement of the functional control 12 along the guiding channel 2221. As it is mentioned above, the control button 121 is depressably mounted on the circuit board 11 such that the corresponding guiding channel 2221 is configured to have an elongated tubular structure to guide the depressing movement of the control button 121. When the joystick 122 is pivotally mounted on the circuit board 11, the corresponding guiding channel 2221 is configured to have a corresponding structure to guide the pivotal movement of the joystick 122. When the trigger lever 123 is movably mounted on the circuit board 11, the corresponding guiding channel 2221 is configured to have a corresponding structure to guide the particular movement of the trigger lever 123. In other words, the guiding slots 222 of the internal enclosure 22 are adapted to limit the operating range of the functional controls 22 for preventing any unwanted movement of the functional controls 12 and to prevent any excess force exerted at the functional controls 12.

Figure 4:
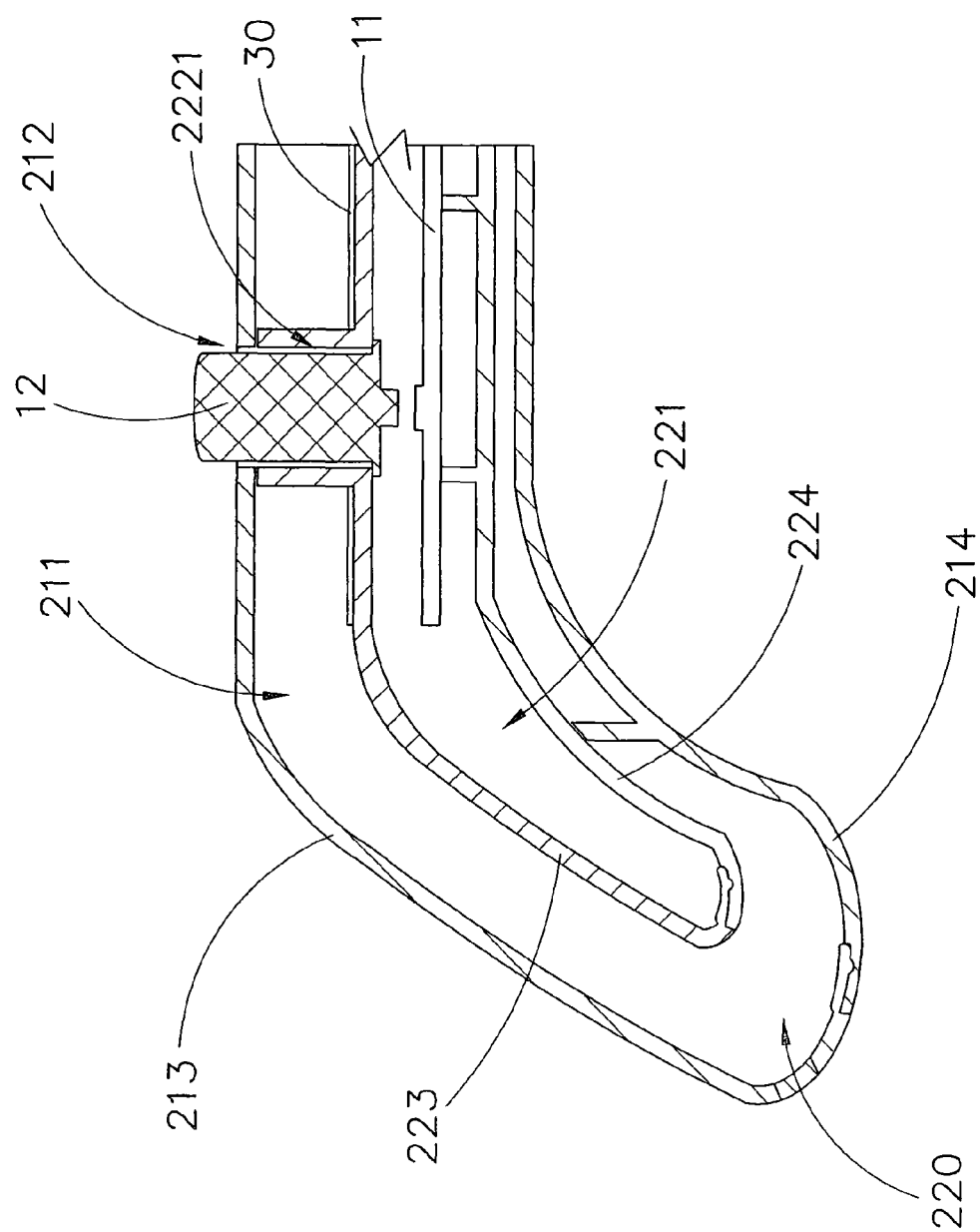
FIG. 4 is a sectional view of the game controller according to the above preferred embodiment of the present invention.

As shown in FIG. 4, the internal enclosure 22 is spacedly enclosed within the outer casing to define an air chamber 220 between an inner side of the outer casing 21 and an outer side of the internal enclosure 22 for absorbing an external impact force on the outer casing 21. Air is considered as one of the best elements to absorb the impact force. Therefore, when the air chamber 220 is formed between the internal enclosure 22 and the outer casing 21, the air within the air chamber 220 is adapted to evenly distribute the external impact force at the outer casing 21 so as to prevent the external impact directly exerting to the circuit board 11 through the internal enclosure 22.

Figure 5:
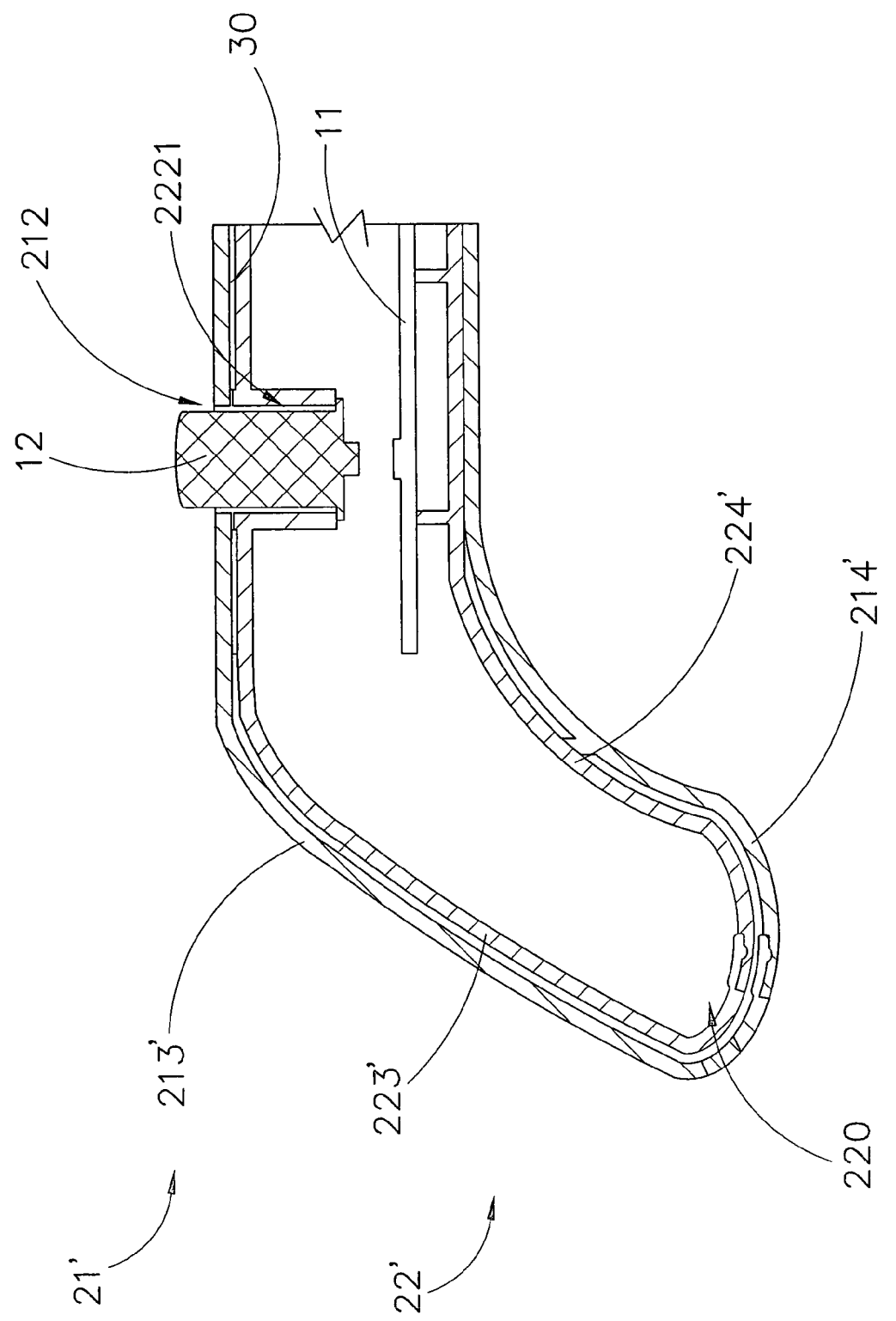
FIG. 5 illustrates an alternative mode of the internal enclosure of the game controller according to the above preferred embodiment of the present invention.

Alternatively, the internal enclosure 22' is overlappingly enclosed within the outer casing 21', as shown in FIG. 5, at a position that the inner side of the outer casing 21' is overlapped on the outer side of the internal enclosure 22' for enhancing a rigid structure of the control housing 20'. Therefore, the inner sides of the upper casing body 213' and the lower casing body 214' are overlapped on the outer sides of the upper internal bracket 223' and the lower internal bracket 224' respectively. In other words, the internal enclosure 21' and the outer casing 21' form the double-wall structure to protect the circuit board 11 therewithin.

As shown in FIGS. 2 and 4, the game controller further comprises a character layer 30 replaceably disposed between the inner side of the outer casing 21 and the outer side of the internal enclosure 22 for enhancing a personalization of the control housing 20. Accordingly, the character layer 30 can be selectively replaced by the player by simply detaching the outer casing 21 from the internal enclosure 22 and can be seen through the outer casing 21. The character layer 30 can be a film printed with a desired character corresponding to the video game to enhance the personalization and visual impression of the game controller of the present invention.

Figure 6:
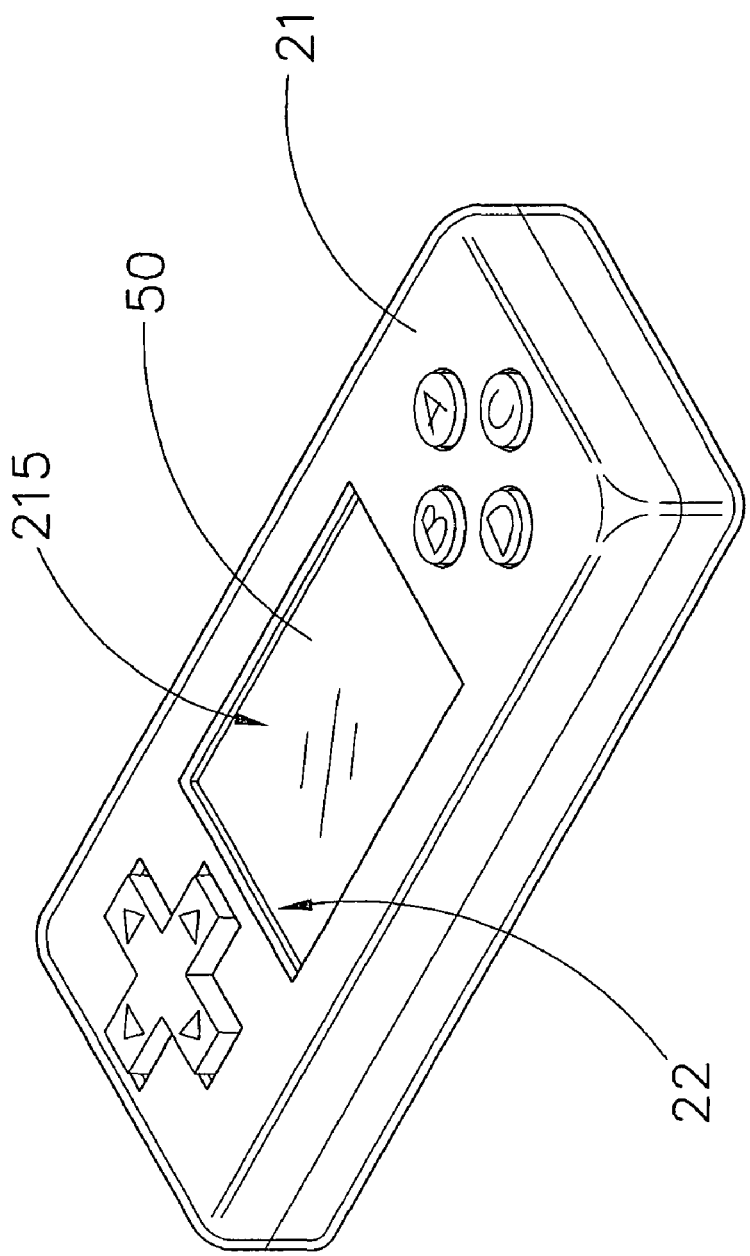
FIG. 6 is a perspective view of the game controller according to the above preferred embodiment of the present invention, illustrating the game controller being embodied as a hand held game device.

As shown in FIG. 6, the game controller of the present invention, which can be embodied as a hand held game device, further comprises a game screen 50 formed on the internal enclosure 22 wherein the outer casing 21 has a window 215 aligned with the game screen 50. In other words, the control housing 20 of the game controller of the present invention is adapted to use as the video input device to connect to the game console and as the hand held game device.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A game controller, comprising:
    a control unit which comprises a circuit board and a plurality of functional controls, wherein each of said functional controls has a movable control end and a signal end operatively coupling with the circuit board; and
    a control housing, comprising:
        an outer casing having a receiving cavity receiving said circuit board therein and a plurality of control holes for said control ends of said functional controls extending out of said receiving cavity, wherein said outer casing further comprises an upper casing body and a lower casing body detachably coupling with said upper casing body edge-to-edge to define said receiving cavity between said upper and lower casing bodies, wherein said upper casing body is snap fitted to said lower casing body in a tool-less manner; and
        an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein said internal enclosure comprises an upper internal bracket and a lower internal bracket sealing and affixing to said upper internal bracket to define said sealing cavity between said upper and lower internal brackets for sealing said circuit board.

2. The game controller, as recited in claim 1, wherein said internal enclosure comprises an upper internal bracket and a lower internal bracket sealing and affixing to said upper internal bracket to define said sealing cavity between said upper and lower internal brackets for sealing said circuit board.

3. The game controller, as recited in claim 2, wherein said outer casing is made of see-through material such that when said internal enclosure is enclosed within said outer casing, said internal enclosure is adapted to be seen through said outer casing so as to enhance an aesthetic appearance of said control housing.

4. The game controller, as recited in claim 3, wherein each of said guiding slots contains a guiding channel extended from said internal enclosure towards said outer casing to communicate said sealing cavity with said respective control hole such that each of said functional controls is secured and guided to extend through said respective guiding channel to said outer casing.

5. The game controller, as recited in claim 4, wherein each of said guiding channel has a predetermine configuration corresponding to a movement of said respective functional control so as to guide said movement of said functional control along said guiding channel.

6. The game controller, as recited in claim 5, wherein said internal enclosure is spacedly enclosed within said outer casing to define an air chamber between an inner side of said outer casing and an outer side of said internal enclosure for absorbing an external impact force on said outer casing.

7. The game controller, as recited in claim 6, further comprising a character layer replaceably disposed between said inner side of said outer casing and said outer side of said internal enclosure for enhancing a personalization of said control housing.

8. The game controller, as recited in claim 5, wherein said internal enclosure is overlappingly enclosed within said outer casing at a position that an inner side of said outer casing is overlapped on an outer side of said internal enclosure for enhancing a rigid structure of said control housing.

9. The game controller, as recited in claim 8, further comprising a character layer replaceably disposed between said inner side of said outer casing and said outer side of said internal enclosure for enhancing a personalization of said control housing.

10. The game controller, as recited in claim 2, wherein each of said guiding slots contains a guiding channel extended from said internal enclosure towards said outer casing to communicate said sealing cavity with said respective control hole such that each of said functional controls is secured and guided to extend through said respective guiding channel to said outer casing.

11. The game controller, as recited in claim 10, wherein each of said guiding channel has a predetermine configuration corresponding to a movement of said respective functional control so as to guide said movement of said functional control along said guiding channel.

12. A game controller, comprising:
a control unit which comprises a circuit board and a plurality of functional controls, wherein each of said functional controls has a movable control end and a signal end operatively coupling with the circuit board; and
a control housing, comprising:
an outer casing having a receiving cavity receiving said circuit board therein and a plurality of control holes for said control ends of said functional controls extending out of said receiving cavity; and
an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein said outer casing is made of see-through material such that when said internal enclosure is enclosed within said outer casing, said internal enclosure is adapted to be seen through said outer casing so as to enhance an aesthetic appearance of said control housing.

13. A game controller, comprising:
a control unit which comprises a circuit board and a plurality of functional controls, wherein each of said functional controls has a movable control end and a signal end operatively coupling with the circuit board; and
a control housing, comprising:
an outer casing having a receiving cavity receiving said circuit board therein and a plurality of control holes for said control ends of said functional controls extending out of said receiving cavity, wherein said outer casing further comprises an upper casing body and a lower casing body detachably coupling with said upper casing body edge-to-edge to define said receiving cavity between said upper and lower casing bodies, wherein said upper casing body is snap fitted to said lower casing body in a tool-less manner; and
an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein said outer casing is made of see-through material such that when said internal enclosure is enclosed within said outer casing, said internal enclosure is adapted to be seen through said outer casing so as to enhance an aesthetic appearance of said control housing.

14. A game controller, comprising:
a control unit which comprises a circuit board and a plurality of functional controls, wherein each of said functional controls has a movable control end and a signal end operatively coupling with the circuit board; and
a control housing, comprising:
an outer casing having a receiving cavity receiving said circuit board therein and a plurality of control holes for said control ends of said functional controls extending out of said receiving cavity; and
an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein each of said guiding slots contains a guiding channel extended from said internal enclosure towards said outer casing to communicate said sealing cavity with said respective control hole such that each of said functional controls is secured and guided to extend through said respective guiding channel to said outer casing.

15. The game controller, as recited in claim 14, wherein each of said guiding channel has a predetermine configuration corresponding to a movement of said respective functional control so as to guide said movement of said functional control along said guiding channel.

16. A game controller, comprising:
a control unit which comprises a circuit board and a plurality of functional controls, wherein each of said functional controls has a movable control end and a signal end operatively coupling with the circuit board; and
a control housing, comprising:
an outer casing having a receiving cavity receiving said circuit board therein and a plurality of control holes for said control ends of said functional controls extending out of said receiving cavity; and
an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein said internal enclosure is spacedly enclosed within said outer casing to define an air chamber between an inner side of said outer casing and an outer side of said internal enclosure for absorbing an external impact force on said outer casing.

17. A game controller, comprising:
a control unit which comprises a circuit board and a plurality of functional controls, wherein each of said functional controls has a movable control end and a signal end operatively coupling with the circuit board; and
a control housing, comprising:
an outer casing having a receiving cavity receiving said circuit board therein and a plurality of control holes for said control ends of said functional controls extending out of said receiving cavity; and
an internal enclosure, which is received in said receiving cavity of said outer casing, having a sealing cavity for said circuit board supporting therein to form a double-wall structure to protect said circuit board and a plurality of guiding slots aligned with said control holes of said outer casing respectively to guide said functional controls extending to said control holes through said guiding slots respectively, wherein said internal enclosure is overlappingly enclosed within said outer casing at a position that an inner side of said outer casing is overlapped on an outer side of said internal enclosure for enhancing a rigid structure of said control housing.

* * * * *